United States Patent
Zhang et al.

(10) Patent No.: US 12,257,891 B2
(45) Date of Patent: Mar. 25, 2025

(54) MULTIPART HOUSING AND ALERT SYSTEM

(71) Applicant: Quantum Fuel Systems LLC, Lake Forest, CA (US)

(72) Inventors: Ming Zhang, Lake Forest, CA (US); Hans VanOyen, Lake Forest, CA (US); Dave Rea, Lake Forest, CA (US); Tae Kim, Lake Forest, CA (US); Paul Prado, Lake Forest, CA (US)

(73) Assignee: QUANTUM FUEL CELLS LLC, Lake Forest, CA (US)

( * ) Notice: Subject to any disclaimer, the term of this patent is extended or adjusted under 35 U.S.C. 154(b) by 465 days.

(21) Appl. No.: 17/841,455

(22) Filed: Jun. 15, 2022

(65) Prior Publication Data

US 2022/0396143 A1 Dec. 15, 2022

Related U.S. Application Data

(60) Provisional application No. 63/210,612, filed on Jun. 15, 2021.

(51) Int. Cl.
| | |
|---|---|
| *B60K 15/067* | (2006.01) |
| *B60K 15/03* | (2006.01) |
| *B60K 15/063* | (2006.01) |
| *B60K 15/073* | (2006.01) |

(52) U.S. Cl.
CPC .......... *B60K 15/067* (2013.01); *B60K 15/073* (2013.01); *B60K 2015/03315* (2013.01); *B60K 2015/0638* (2013.01)

(58) Field of Classification Search
CPC ................ B60K 15/067; B60K 15/073; B60K 2015/03315; B60K 2015/0638; F17C 13/08; F17C 13/084; F17C 2205/00; F17C 2205/0103; F17C 2205/0107; F16B 21/09; F16B 21/06
See application file for complete search history.

(56) References Cited

U.S. PATENT DOCUMENTS

| | | | |
|---|---|---|---|
| 9,086,187 B2 * | 7/2015 | Gibb | ........................ B60R 16/08 |
| 2017/0080798 A1* | 3/2017 | Van Der Linden | .. B62D 35/001 |

\* cited by examiner

*Primary Examiner* — Jason D Shanske
*Assistant Examiner* — Scott Lawrence Strickler
(74) *Attorney, Agent, or Firm* — BAKER HOSTETLER, LLP

(57) ABSTRACT

A nested shell enclosure covering behind the cab gaseous fuel tanks on a three dimensional structure. The method and system provides a releasable enclosure around the structure or a rack or the like formed by attaching a plurality of shell components which nest in a sequential pattern over the structure via housing latch assemblies formed on the interior wall surface of shell components to catch bracket assemblies attached to the structure and wherein the latch and catch assemblies releasably affix the enclosure shells to the structure and together without the use of threaded fasteners; and, wherein the shells components are nested and evenly disperse force along the perimeter edges where the shells overlap.

19 Claims, 9 Drawing Sheets

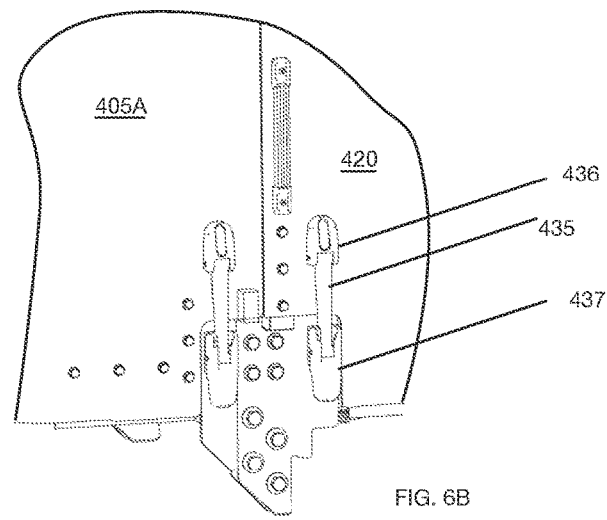
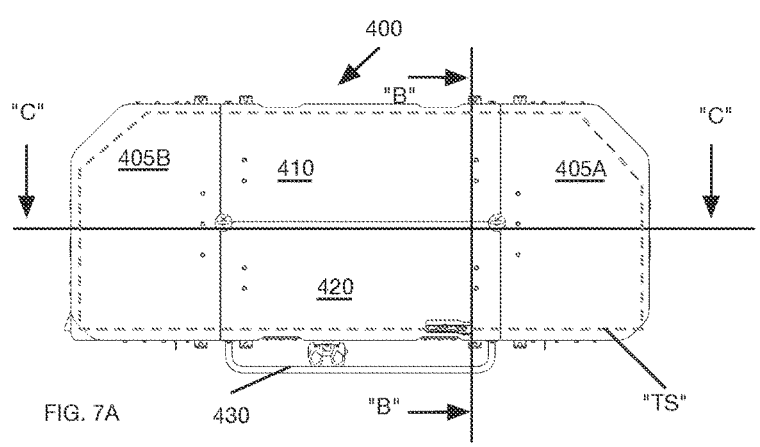
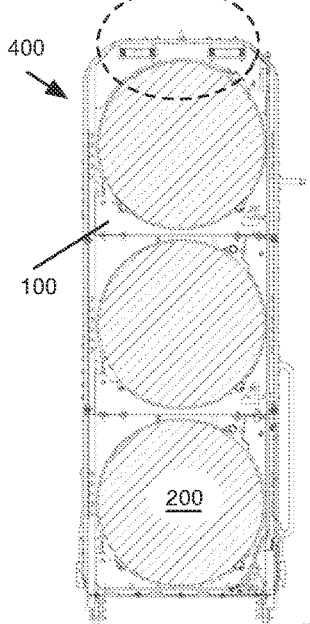
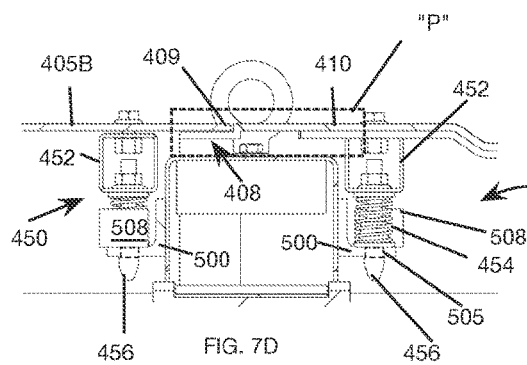
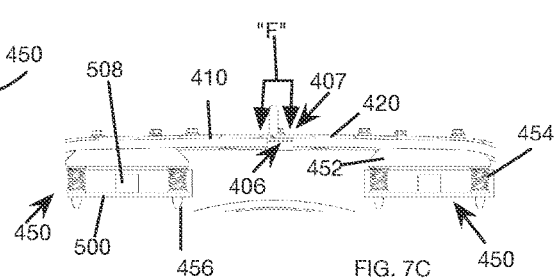

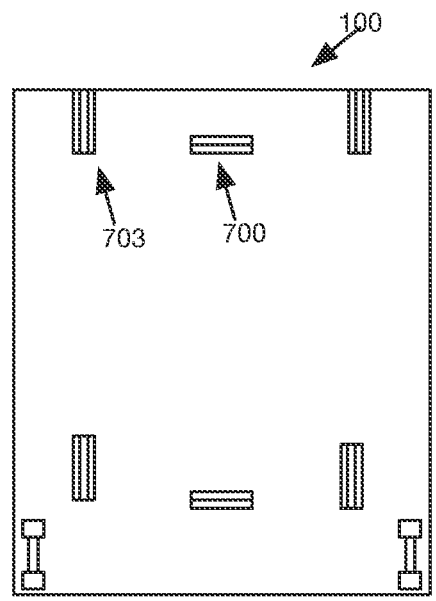
FIG. 8C
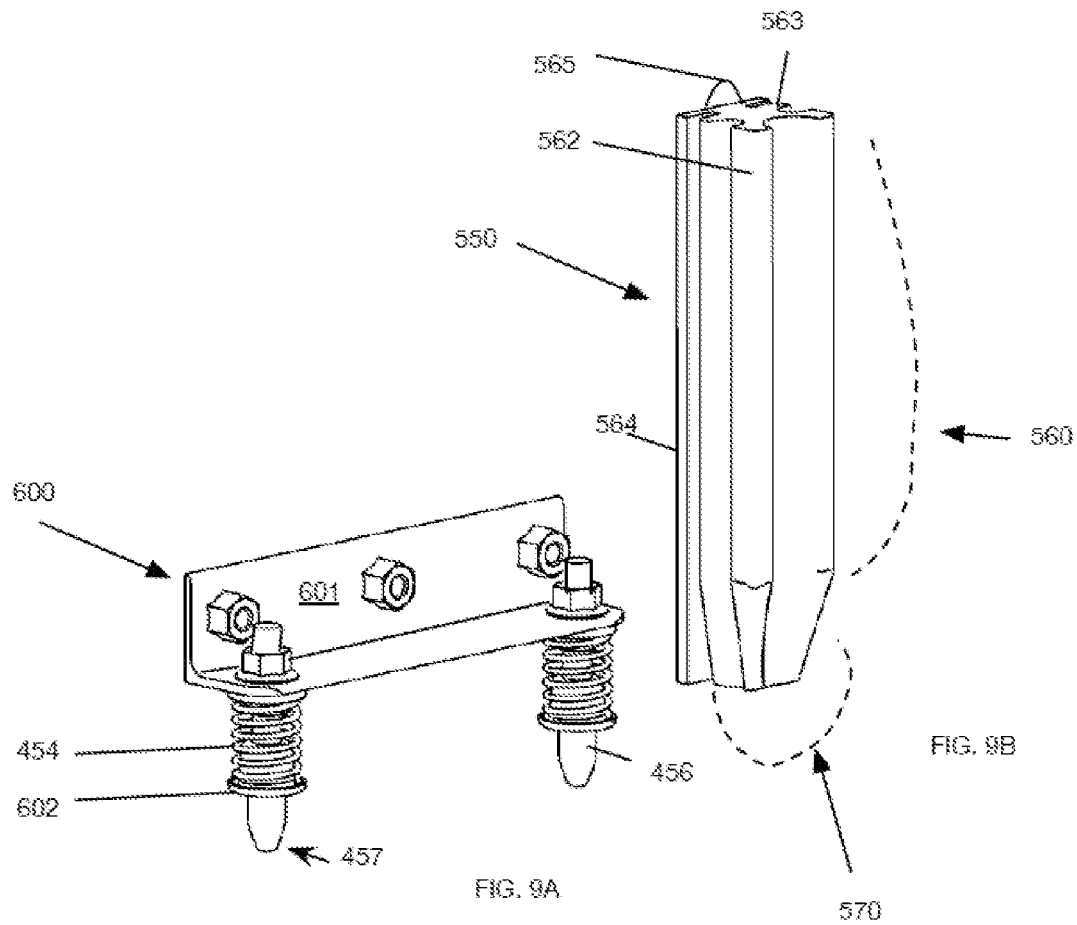
FIG. 9A
FIG. 9B

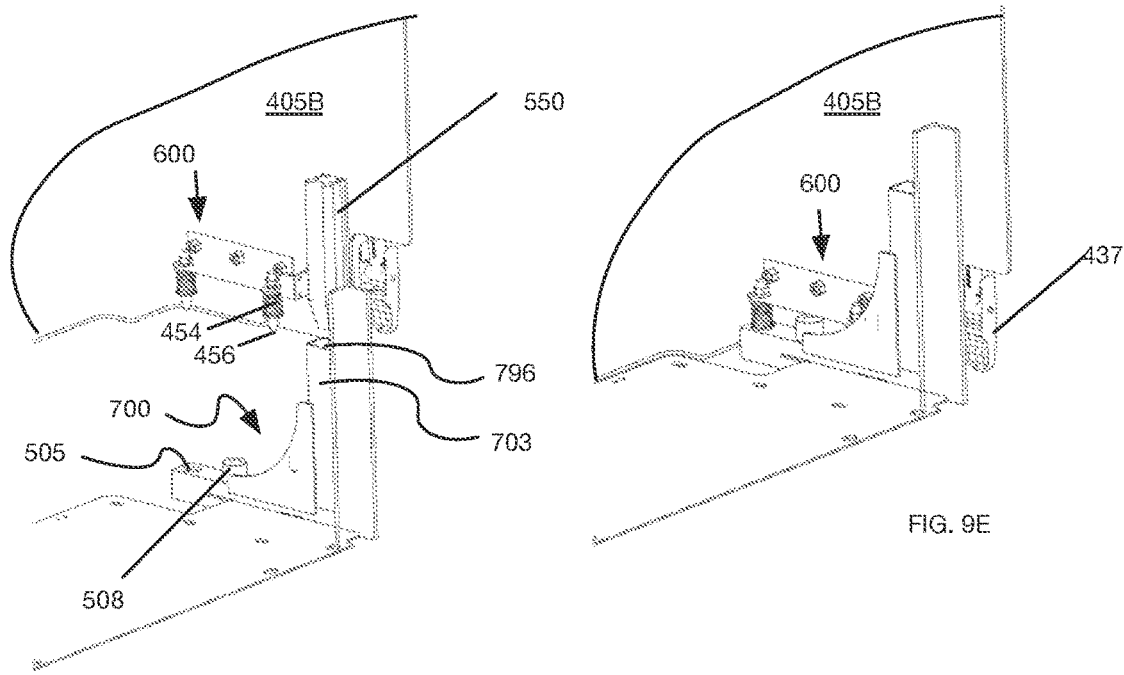
FIG. 9D
FIG. 9E
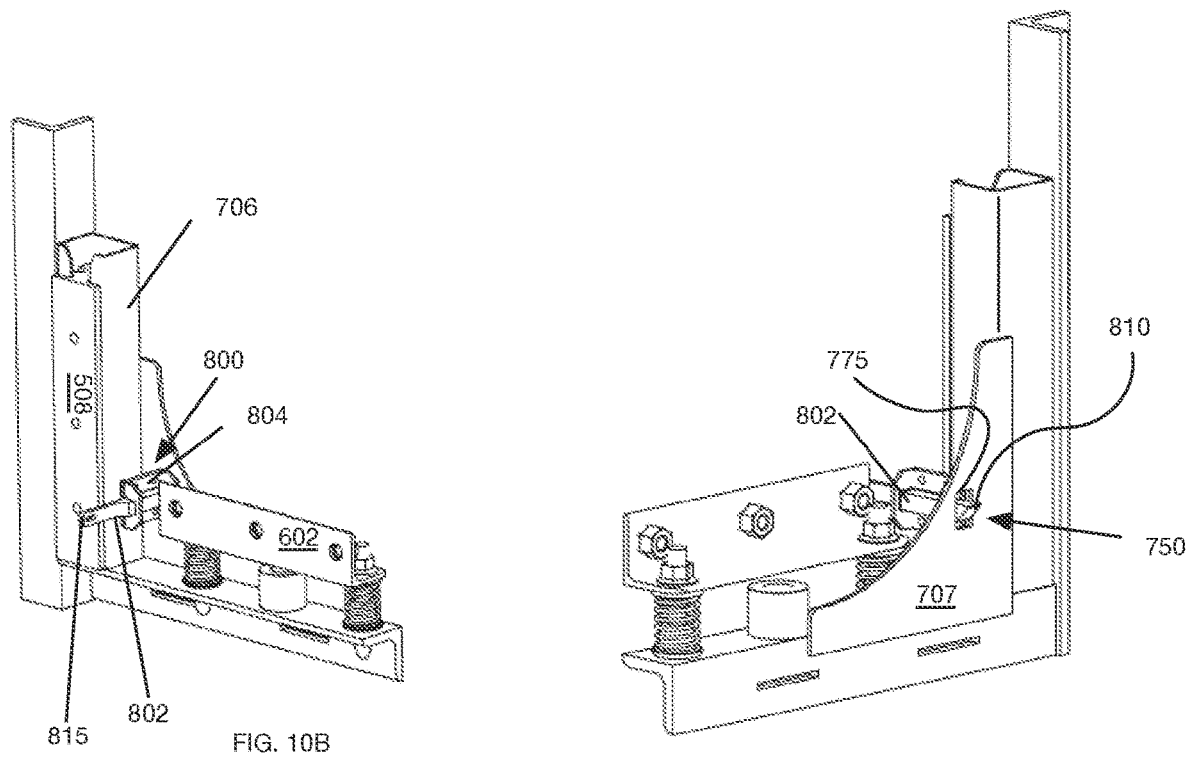
FIG. 10B
FIG. 10A

MULTIPART HOUSING AND ALERT SYSTEM

This non-provisional application claims the benefit of priority of U.S. Provisional Patent Application Ser. No. 63/210,612, filed Jun. 15, 2021, the disclosures of which are incorporated herein by reference in their entireties.

BACKGROUND

1. Field

This disclosure relates to a multifunction enclosure suitable for use on a moving vehicle

2. General Background

Pressurized cylinders are useful; for storing and transporting fuels such as hydrogen, natural gas (CNG) and propane. Storage of gaseous fuel cylinders/tanks in a tractor or trailer must meet crash safety requirements. Such fuel vessels for part of a fuel supply system requiring valves, connectors, sensors and other balance of plant items. Further, turbulent airflow around a tractor trailer increases the drag coefficient and reduces increasing costs.

FIGS. 1 and 2 are an overview of a tractor 10 (cab) and trailer 20 arrangement with a covered or enclosed 30 rack of gaseous fuel tanks 50. Traditional systems of enclosures (30) shroud said gaseous fuel vessels on a vehicle.

Housings or enclosures both improve laminar airflow during driving. Racks and fuel tanks or vessels have valves, controllers and other balance of plant items which benefit from protection within an enclosure. Such gaseous fuel vessels transported on highways are subject to a plethora of highway regulations which include the need for regular inspections. What is apparent is the large quantity of threaded fasteners 65 are utilized through threaded holes 60 to construct the enclosure. If the enclosure cannot be disassembled without lifting it over the rack and tanks it required additional equipment and is antithetical to the necessary required inspections thereby taking vehicles out of service due to delays in inspecting for safety requirements.

Each fastener must be fitted into a matching receptacle and each of which must be removed to remove the panels of the shroud or cover. Moreover, after a shroud have been removed to allow inspection of gaseous fuel system the fasteners each have to be reinserted and connected at a predetermined torque level to assure the public that the shroud or part thereof cannot come loose from a vehicle travelling on a highway. Further, should any fasteners by cross fastened or in some way damage the threaded receptacle and/or the fastener may require further inspection to determine the corrective procedure. The above scenario can lead to time delay and costly corrective measures.

It is therefore a desideratum to provide an secure the gaseous fuel system and balance of plant in an enclosure which reduces at least one of removal and attachment costs and time.

DISCLOSURE

Disclosed herein is a system and method to protect an enclosed space with an housing and provided for a simplified removal and attachment process. In the case of gaseous fuel storage or fuel system, the improved enclosure reduces costs, losses and delays. Moreover, it reduces the man hours and physical activity, repetitive motion injury associated with removing hundreds of fasteners necessary to disengage and engage traditional enclosures. Moreover, such fuel tanks are an expensive part of a tractor trailer infrastructure and should be protected from tampering and the environment.

Disclosed herein are systems, devices and methods of multifunction a lightweight enclosure which covers and protects a three dimensional structure such as a rack, housing, container or rack. In some instance the structure may contain fuel tanks. In some instance the cooperation between assemblies and mounting fixtures on the structure and enclosure simplify engagement and disengagement of the enclosure with the three dimensional structure and/or the vehicle.

Disclosed herein are aspects of exemplary implementations of devices and systems to enclosure or protect a space which may include a space containing fuel tanks behind a cab of a vehicle including a fuel system. Exemplars may include a three dimensional structure such as a rack within the enclosure having a plurality of catch bracket assemblies attached thereto. In some instances fuel tanks may be affixed to the structure; a multipart enclosure is formed of a plurality of shells configured to nest onto one another and fit over the structure; a plurality of housing latch assemblies formed on the interior wall surfaces of the shells and configured to mate with a corresponding catch bracket assembly on the rack or three dimensional structure; wherein the latch and catch assemblies releasably affix the enclosure parts to the rack and together without the use of threaded fasteners; and, wherein the nested shells evenly disperse force along the perimeter edges where the shells overlap. In some instances the nested shells further comprising a first end, a second end, a first side, and a second side.

In some instances aspects include one of a ledge or leading edge formed around at least a portion of a perimeter of each shell; and, wherein the leading edges and ledges are configured to cooperate to disperse force along the perimeter edges when the enclosure is affixed to an internal structure. In some instances each housing latch assembly comprises a bracket attached to the interior wall surface; at least one latching pin is affixed to the bracket; and, a movable coil spring surrounds the latching pin.

In some instances each catch bracket assembly comprises a catch member attached to the rack having a pin guide corresponding to and configure to receive a corresponding latching pin;

an elastomeric stop; and, wherein the elastomeric stop prevents downward movement of the bracket and latching pins beyond a preset threshold. In some instances the system includes at least one movable strap fixture affixed to the exterior of one or more end and side shell; an anchor each have a latching end affixed to the rack or structure and configured to receive the latching end; and, wherein the latch and catch assemblies compress the coil springs when a shell end or side is moved in the "z" axis relative to the rack thereby moving the latching end in a position to mount it with the anchor and affix the enclosure shells to the structure or rack. In some instances one or more positional sensors may be attached to the rack configured to report if the nested shell sides and ends fail to be attached to the structure or rack in a predetermined position. In some instances an activator affixed to the shell end or sides configured to be adjacent to each positional sensors when the enclosure shell ends and sides are attached via the one or more movable strap to the structure or rack. In some instances the sensor is in signal communication with an alert controller to determines if the positional sensor is in a position that requires reporting or an alert. In some instances the alert controller is configured to at least one of disable the operation of a vehicle, set off an alarm inside a vehicle and communicate wirelessly to an application on a computing device remote from the vehicle to alert the vehicle operator or other interested party.

Disclosed herein are aspects of exemplary implementations of devices and systems to enclosure or protect a space which may include a space containing fuel tanks behind a cab of a vehicle including a fuel system. Exemplars may include a three dimensional structure such as a rack within the enclosure having a plurality of catch bracket assemblies attached thereto. In some instances fuel tanks may be affixed to the structure; a multipart enclosure is formed of a plurality of shells configured to nest onto one another and fit over the structure; a plurality of housing latch assemblies formed on the interior wall surfaces of the shells and configured to mate with a corresponding catch bracket assembly on the rack or three dimensional structure; wherein the latch and catch assemblies releasably affix the enclosure parts to the rack and together without the use of threaded fasteners; and, wherein the nested shells evenly disperse force along the perimeter edges where the shells overlap, the nested shells further comprising a first end, a second end, a first side, and a second side. The system includes a locking means having a lock interface affixed to the structure or rack; an opening in the lock interface configured to accept insertion of a locking plunger; a linearly movable spring actuate plunger within plunger guide affixed to the interior wall surface of a shell configured to mate with the opening; and, wherein the plunger slides into the open of the lock interface when the strap fixture attaches the shell to the structure or rack. In some instances the system includes at least one slider attached to an interior wall surface of an end or side shell; a slider guide attached to the rack configured to receive the slider; and, wherein the slider's tapered head is configured to mate with the slider guide and align the latching pin of the housing latch assembly with a corresponding pin guides thereby of a the catch bracket assembly. In some instances at least one of the slider or the slider guide is elastomeric.

Disclosed herein are aspects of exemplary implementations of methods, devices and systems to enclosure or protect a space including mounting gaseous fuel tanks on a rack or three dimensional structure behind the cab of a tractor trailer; forming a releasable enclosure around the structure rack by attaching a plurality of nested shell components to the structure rack via housing latch assemblies formed on the interior wall surface of shell components to catch bracket assemblies attached to the structure rack; wherein the latch and catch assemblies releasably affix the enclosure shells to the rack structure and together without the use of threaded fasteners; and, wherein the shells components are nested and evenly disperse force along the perimeter edges where the shells overlap. In some instances the structure includes the nested shell components further comprise a first end, a second end, a first side, and a second side. In some instances the system and method evenly dispersing force "F" along perimeter edges of shells when the enclosure is affixed to the structure rack; and, wherein leading edges and ledges formed on at least a portion of the perimeter are configured to cooperate to disperse force along the perimeter edges.

In some instances the method includes placing housing latch assemblies having at least one latching pin affixed to a bracket and configured with a movable coil spring surrounding the latching pin to the interior wall surface of a shell interior wall surface; placing catch bracket assemblies having a catch member attached to the rack configure to receive a corresponding latching pin; and, placing an elastomeric stop on the catch bracket configured to prevent downward movement of the bracket and latching pins beyond a preset threshold. In some instances the method includes attaching at least one movable strap fixture affixed to the exterior of one or more shell components to the structure rack; and, wherein the latch and catch assemblies compress the coil springs when the shell is moved in the "z" axis relative to the rack thereby moving the latching end of the movable strap fixture in a position to mount it with an anchor to the structure rack.

In some instances the method includes one or more positional sensors attached to the structure rack configured to report if the releasable enclosure attached to the structure rack is fails to be attached in a predetermined position.

DRAWINGS

The above-mentioned features of the present disclosure will become more apparent with reference to the following description taken in conjunction with the accompanying drawings wherein like reference numerals denote like elements and in which:

FIG. 6B is a back view of a quick release aerodynamic tank enclosure of FIG. 6A at section "A";

FIG. 7A is a top view of a quick release aerodynamic tank enclosure;

FIG. 7B is a view along arrows "B-B" of FIG. 7A;

FIG. 7C is a view of section "B" of FIG. 7B.

FIG. 7D is a view along arrows "C-C" of FIG. 7A;

FIG. 8C is a side view of three dimensional structure with quick release features;

FIG. 9A-9E are views of the guides, latches and catches forming a part of a quick release aerodynamic enclosure assembly method and system;

FIGS. 10A and 10B are views of the guides a plunger safety lock; and,

As shall be appreciated by those having ordinary skill in the art, the figures are not to scale, and modifications to scale within a figure or across the figures are considered within the present disclosure. All callouts in figures are hereby incorporated by this reference as if fully set forth herein.

FURTHER DISCLOSURE

According to one or more exemplary implementations, as shown in FIGS. 1-11B 1—there are disclosed methods, devices and systems of lightweight nested enclosures which eliminate or improve on prior art systems. The multi-part enclosure provides release and connect innovations to at least one of support quicker release, ease of handling, safety, reduced downtime for inspections, easier maintenance of enclosed systems.

Figure 1:
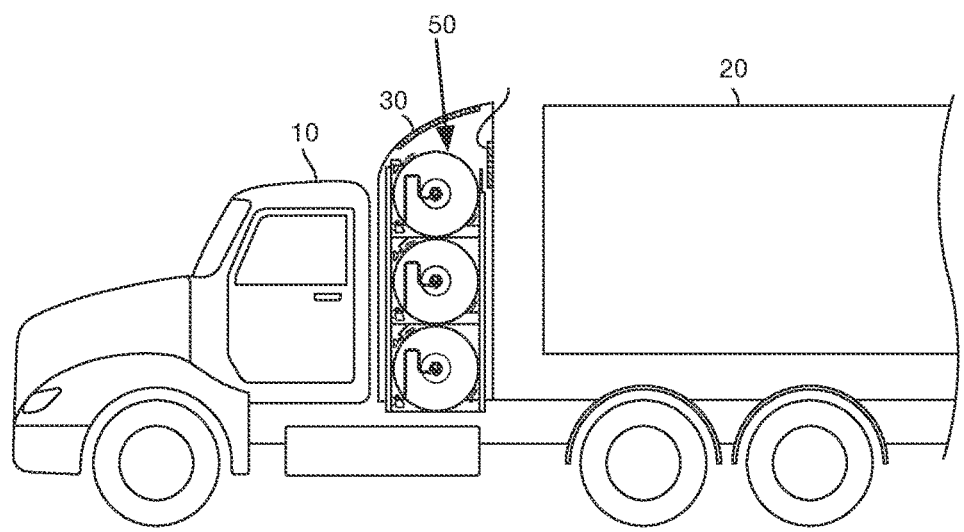
FIG. 1 is a traditional tractor and trailer with an enclosure (prior art) over fuel a rack with fuel cylinders.
Figure 2:
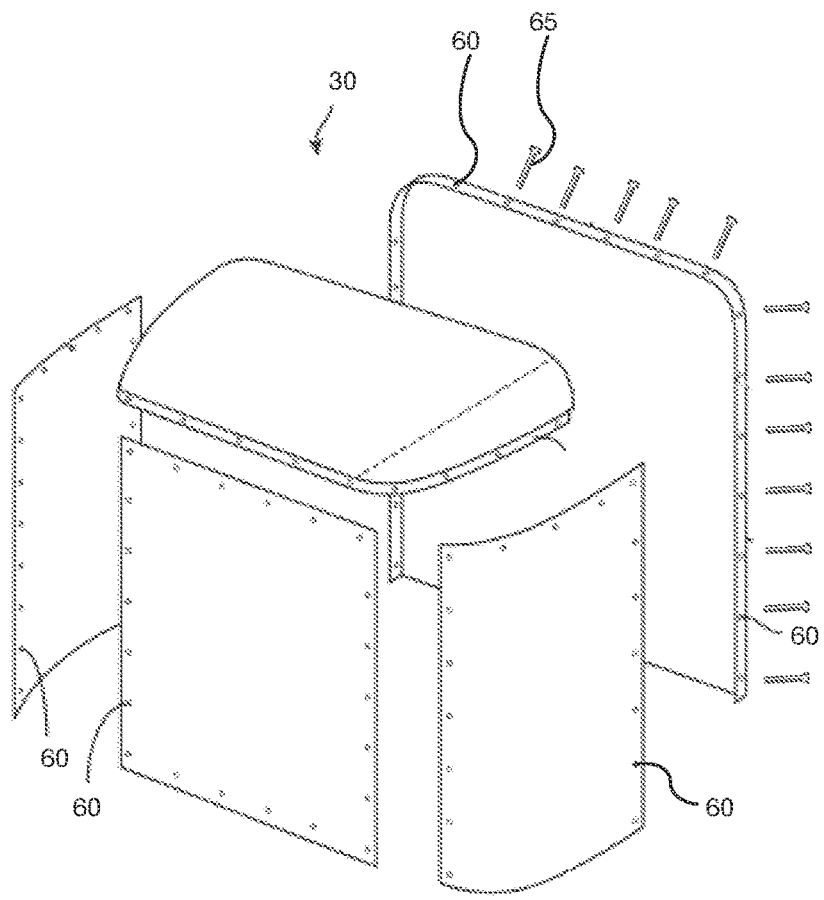
FIG. 2 is a traditional enclosure (prior art) over fuel a rack with fuel cylinders.
Figure 3:
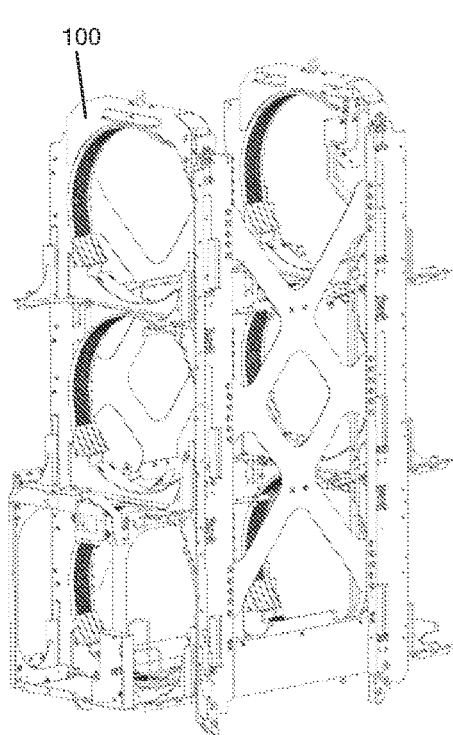
FIG. 3 shows a rack for use with a tractor trailer aerodynamic tank enclosure.
Figure 4:
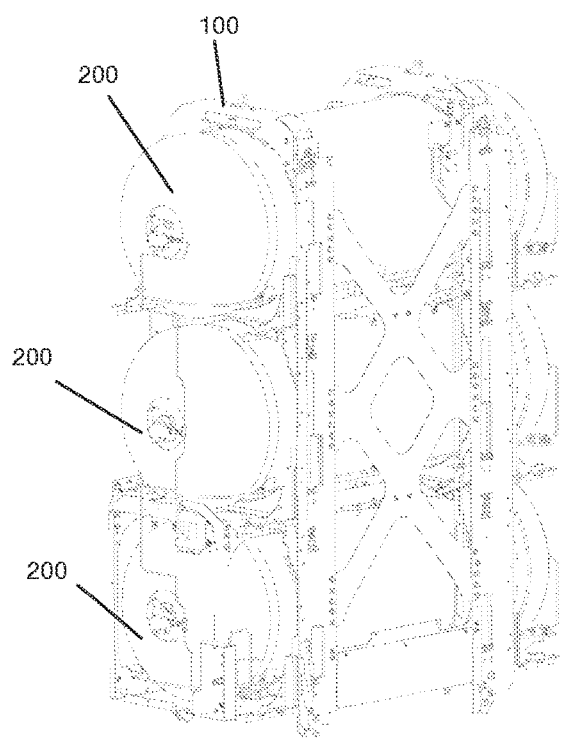
FIG. 4 shows a rack with tanks for use with a tractor trailer aerodynamic tank enclosure.
Figure 5:
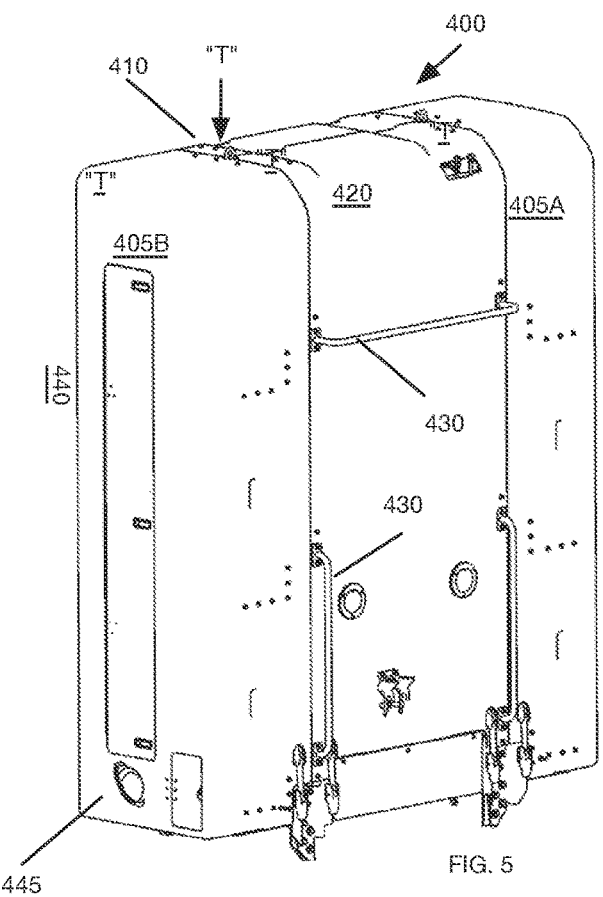
FIG. 5 is an aerodynamic quick release tank enclosure.
Figure 6A:
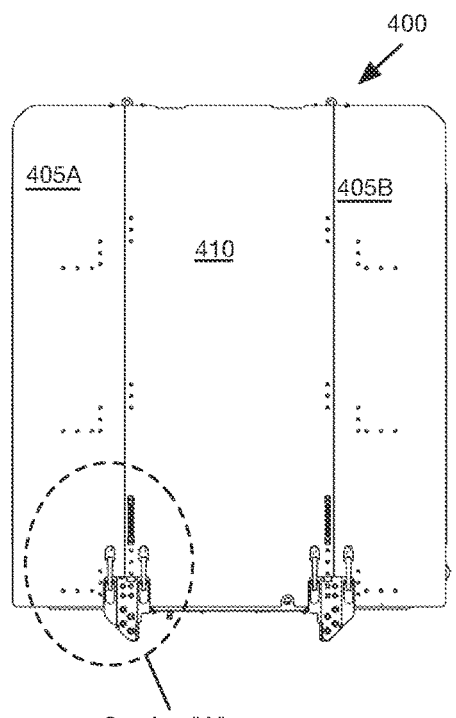
FIG. 6A is a back view of a quick release aerodynamic tank enclosure over a rack of tanks.

FIGS. 3 and 4 illustrate a rack 100 system which may be enclosed. Tanks for gaseous fuel 200 may be affixed within the rack. Those of ordinary sill in the art will understand that the rack and gaseous fuel tanks are but one exemplar of what may be enclosed by the multipart housing (or enclosure) and/or alert system.

FIGS. 5-7A show exterior view and partial exterior views of the multipart enclosure 400. When utilized with a tractor trailer mobile system the enclosures protects housed items such as fuel tanks and may reduce turbulent airflow around at least one of the tractor and trailer.

The multipart enclosure 400 is illustrated as being formed of four nested shell components (410, 420, 405A and 405B). The illustration of four components is not a limitation. A larger or small number of shell components may be nested in accordance with the disclosure and those of ordinary skill in the art will recognize the scope of the disclosure to include such design variations.

The shell, as illustrated, includes a first end 405A, second end 405B, a first side 410, a second side 420. Each shell component also includes a section "T" of the shell which when nested in an assembled enclosure configuration form a top surface (see FIG. 7A) "TS". Handles 430 are formed on, or attached to, the second side 420 which provide a gripping surface for removal or attachment. Movable strap fixtures 435 affixed to one of the multipart of the enclosure with an anchor 436 each have a latching end 437 which mates with a catch 438 (see FIG. 11A) attached to the rack.

FIGS. 7A-7D illustrate aspects of the nesting arrangements and closure methods and systems of the aerodynamic lightweight nested enclosures. FIG. 7A is a top view of a fully assembled enclosure 400. FIG. 7B is a cut-away view taken along the line of arrows "B-B" of FIG. 7A. A rack 100 supporting gaseous fuel tanks 200 are within the enclosure. The enclosure is affixed to the rack 100 without fasteners or threaded holes 60 and 61. The elimination of such fasteners eliminates the time consuming task of removing or inserting a large volume of fasteners (see FIGS. 1 and 2). Moreover, an enclosure that is part of a mobile system is subject to inspection and safety oversite. Specifically, in prior art system a mis threading of a fastener may require corrective action such as re-tapping or over drilling the threaded hole in a rack. Changes such as drilling or retaping may require further inspection and approval thus reducing efficiency and costing time. A failure to attach all fasteners with torque in a nominal range may result in unevenly attached panels which in turn will degrade over time due to uneven stress. Rather, the instant disclosure eliminates threaded fasteners and reduces the disassembly and assembly process by virtue of eliminating the plethora of fasteners.

Section "B" of FIG. 7B is enlarged in FIG. 7C and Section "C" of FIG. 7B is enlarged in FIG. 7D. The edges of each shell form a perimeter and along at least a portion of the perimeter "P", the shells nest at the ledges and leading edges during assembly the nesting will disperse or distribute force "F" at the perimeter of each shell during attachment of the shells, in a predetermine sequence of shell placement, to the rack as disclosed herein.

The first side 410 has a first ledge 406 configured to fit beneath the leading edge 407 formed at at least a portion of the perimeter of the second side 420. The first side and second side are positioned over the rack and oriented for proper nesting and assembly via top latch-catch assemblies 450. The assembles have one or more latches support on a bracket 452 which is affixed to the interior wall surface ("IWS") of a top portion of the multipart shell. A spring means, such as a coil spring 454 is held on a latching pin 456 wherein the latching pin is aligned via a catch bracket 500. The catch bracket provides one or more through pin guides 505 which allow entry of the latching pins and whereby the insertion of the latching pin causes the coil spring 454 to compress thereby aligning and holding the enclosure shell portion (side or end) in a predetermined orientation to the rack and other shell components. A elastomeric stop 508 may be added to the catch bracket to limit the depth the latching pin may pass into the alignment guide. The stop can prevent movement beyond a predetermined threshold. Shown in FIG. 7D is a second ledge 408 formed at at least a portion of the permitter "P" of the first side and configure to fit beneath a leading edge 409 formed at at least a portion of the perimeter of the second end 405B. Each side or end has a perimeter "P" and on each side or end a ledge or leading edge if formed on at least a portion of that perimeter wherein the shells are nested together during assembly.

Figure 8A:
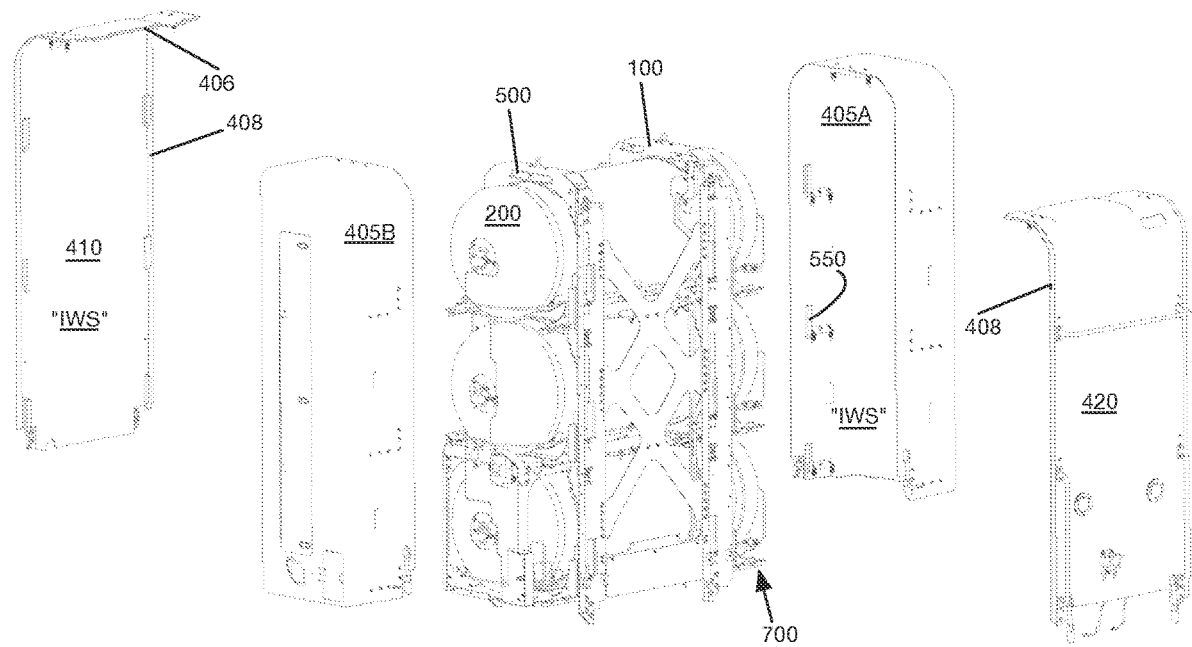
FIG. 8A is a disassembled view of a quick release aerodynamic enclosure.
Figure 8B:
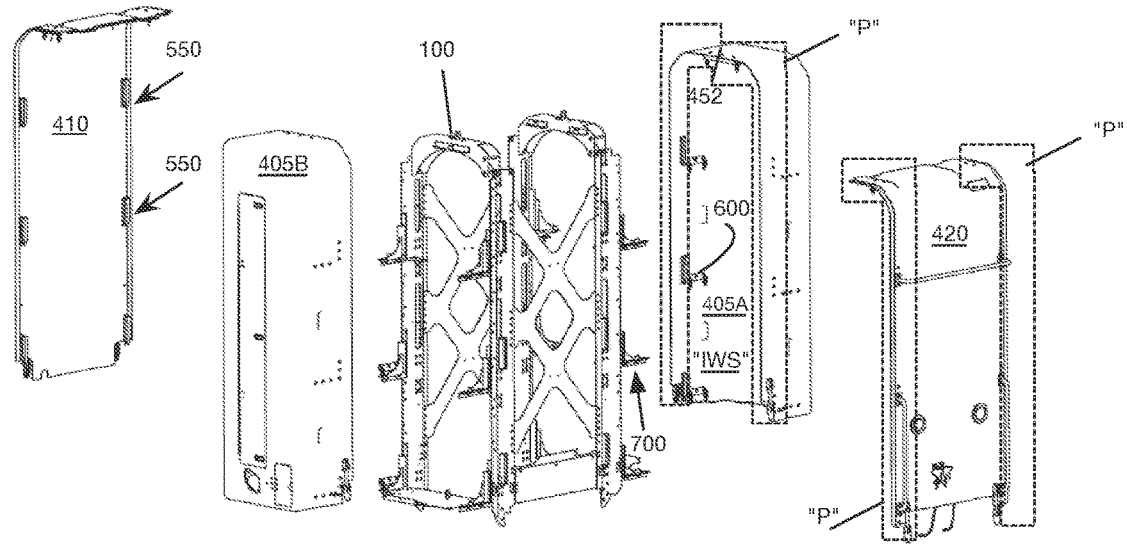
FIG. 8B is a disassembled view of a quick release aerodynamic enclosure.

FIGS. 8A and 8B show a exploded multipart enclosure with a rack to be enclosed 100 and a rack holding tanks 200 to be enclosed and aspects of latching, aligning and catching methods and devices. In some instances the rack or three dimensional structure enclosed is affixed or anchored to a vehicle which moves on at least one of land, sea, air and space.

Figure 9C:
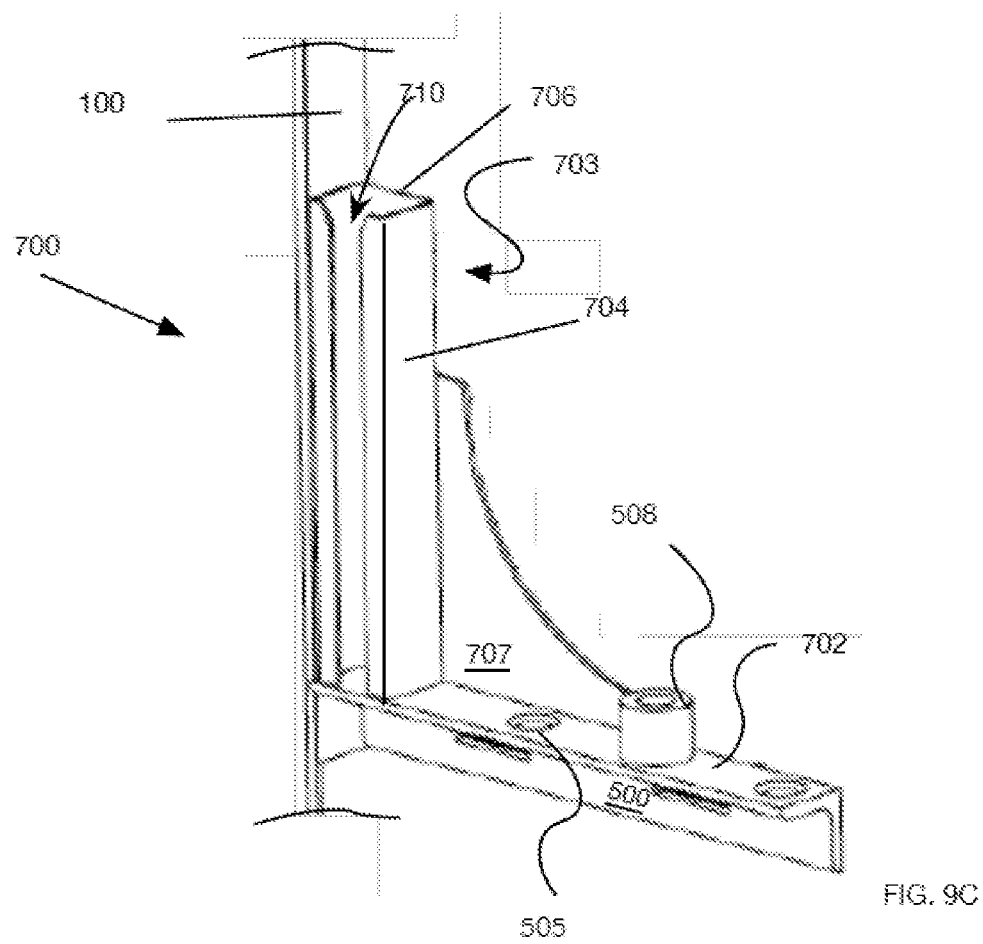

Sliders 550 are both alignment means and bumpers configured to urge multipart shell components into a predetermined configuration during assembly. Each housing latch assembly 600 are fixed to each of the multipart shell components (405A. 405B, 410 and 420) on the interior wall of the shell and oriented to mate slider guides with catch bracket assembly 700 which are affixed to the rack. FIG. 9A shows additional aspects of an exemplar of housing latch assemblies 600 formed on a bracket 601 and FIG. 9B shows aspects of a slider 550. FIG. 8C shows a side face of a three dimensional structure with quick release features such as catch bracket assembly 700 and slider guides 703 configured to engage with corresponding housing latch assemblies and sliders. FIG. 9C shows additional aspects of a catch bracket assembly 700.

FIGS. 9A-9C show aspects of an exemplary attachment system for the multipart enclosure. The housing latch assemblies 600 are configured to be affixed to the interior wall surface (IWS) of the first side, second side, first end and second end. At the movable end of the coil spring 455 is a cup washer 602 which limits the movement of the coil spring towards the shaped end 457 of the latching pin 456. In operation the cup washer sits against the catch member 702 and when the shaped end 457 of the latching pin mates with an pin guide 505 the latching pin moves downward and the spring compresses. The elastomeric stop limits the downward movement of the latching pin relative to the catch bracket 700.

The catch bracket. Optionally, a structural panel 707 may be added to support the catch member against other parts of the rack 100. A slider guide 703 is illustrated as part of the catch bracket. However, those of ordinary skill in the art will recognize that the slider guide may be separate from the catch bracket and such a change is within the scope of this disclosure.

The slider guide are configured to accept the insertion and removal of a slider 550. In some instances the slider may be formed of a metal or plastic material. In some instances the slider is formed of a rubber or elastomeric material. In other instance the slider may be a metal material or a material harder than the guide. The sliders function primarily as an alignment fixture. Elastomeric sliders will also act as both shock absorbing bumpers (being of a softer material) for each of the nested shell pieces and for a shock absorption system for all the nested shell components in the attached configuration forming an enclosure. The elastomeric sliders dampen movement and noise. Dampening movement of a lightweight shell will reduce wear that dimmish component life. The slider has a body 560 that is shaped with multiple front flexible lobes 562 and one rear flexible lobe 563 which run axially along its length and a mounting foot 564 is on one side of the slider adjacent to the rear flexible lobe 563 forming a mounting neck 575 therebetween. The slider is attached to the inside of a nested shell component via the mounting foot. A slider head 570 is a shaped portion of the slider (whether metal or a hard material of a softer material) is configured to a taper whereby it allows for some variation from perfect alignment when the nest shell components are moved into the enclosure configuration. The attachment of nest shell components is a blind attachment meaning the operator cannot easily see the latches and catches. Accordingly, the disclosed system provides a softer alignment with the elastomeric sliders. This method of assembly also provides for correction of slightly misaligned part regardless of slider softness or hardness wherein the slider head's smaller diameter provides for greater tolerance to misalignment.

The slider fits into the slider guide 703. The slider guide is configured and oriented to mate with the slider. In some instances the slider guide may be a softer material than the slider and it may act to dampen or absorb shock. In other instances the slider guide may be a harder material than the slider. In some instances the slider and slider guide may be of similar or the same elasticity. It is a channel with a body 704, an open end 706 and a slot 710 which corresponds to the mounting foot neck 565. When the latching pins are within the catch bracket pin guides 505 a nested shell component is properly aligned.

Methods of Assembly:

The main aspects of a basic assembly exemplary are the first step of assembling the enclosure by placing the first side 410 on the rack 100 and aligning the latching pins with the pin guides 505 in catch bracket assemblies 700 as described above. That placement provides the first ledge 406 of the frost side in the correct configuration to add the second side. The second side 420 is then aligned and added via the catches and latches with its leading edge 407 fitting on top of the first ledge thereby nesting against the first side 410.

At this stage of the construction the first and second sides may be affixed via latching the movable strap fixtures 435 with catch 438 (see FIG. 11A) attached to the rack. That attachment may be followed by attachment of the ends as described below.

Alternatively before latching the first and second sides with strap fixtures the first and second ends 405A and 405B may be placed on the nested structure. The first side and the second side each present a second ledge 408 which is configured to fit under the leading edge 409 of the first and second ends. When aligned and placed on the rack and over the ledges of the first side and second side the first and second ends over lay and contain the second ledges forming the nested structure. The nested structure and ledge-edge arrangement provides for even pressure against the interface between shell components reducing wear and eliminates the need for fasteners with all the previously described problems. Further the nested arrangement eliminates the need to have worker on top of the enclosure to remove fasteners. The nested arrangement eliminate a need for measuring the torque on each threaded fastener. Next the first and second sides are affixed via latching the strap fixtures 435 with catches 438 then the ends are affixed via latching the movable strap fixtures 435 with catches 438.

Additionally, to further provide for additional safety shown in FIGS. 10A to 11B are locking and sensing exemplars. If a nested shell component becomes disassociated from the rack or is improperly attached the nested shell components could become disassembled or damaged. A safety option deploys a locking means 800 shown affixed to the catch bracket assembly 700. In one exemplary the locking means is a spring actuate plunger 802 which is held to the catch bracket assembly 700 in a plunger guide 804. The back side 602 of the housing latches is affixed against a nest shell component when assembled. Through the structural panel 707 a lock interface 750 is formed having an opening 775 through which the insertion end 810 of the plunger passes. To operate the plunger 802 an operator grasps and pulls the end of the plunger 815 away from the enclosure and compresses the spring means (not shown) to retract the insertion end 810. The insertion end may be angled whereby the insertion end during construction of the enclosure can travel backwards as the nest shell component is pulled downward during assembly and snap into the lock interface. However, to remove the nested shell component the operator must actively pull the end of the plunger 815. Accordingly the nested shell components are firmly locked in place without any fasteners and removal is simplified via releasing plungers. Yet further, the coil spring of the latch-catch assemblies 450 urge the nested shell component upward when the plungers are released assisting in removal of the nested shell components for disassembly.

Figure 11A:
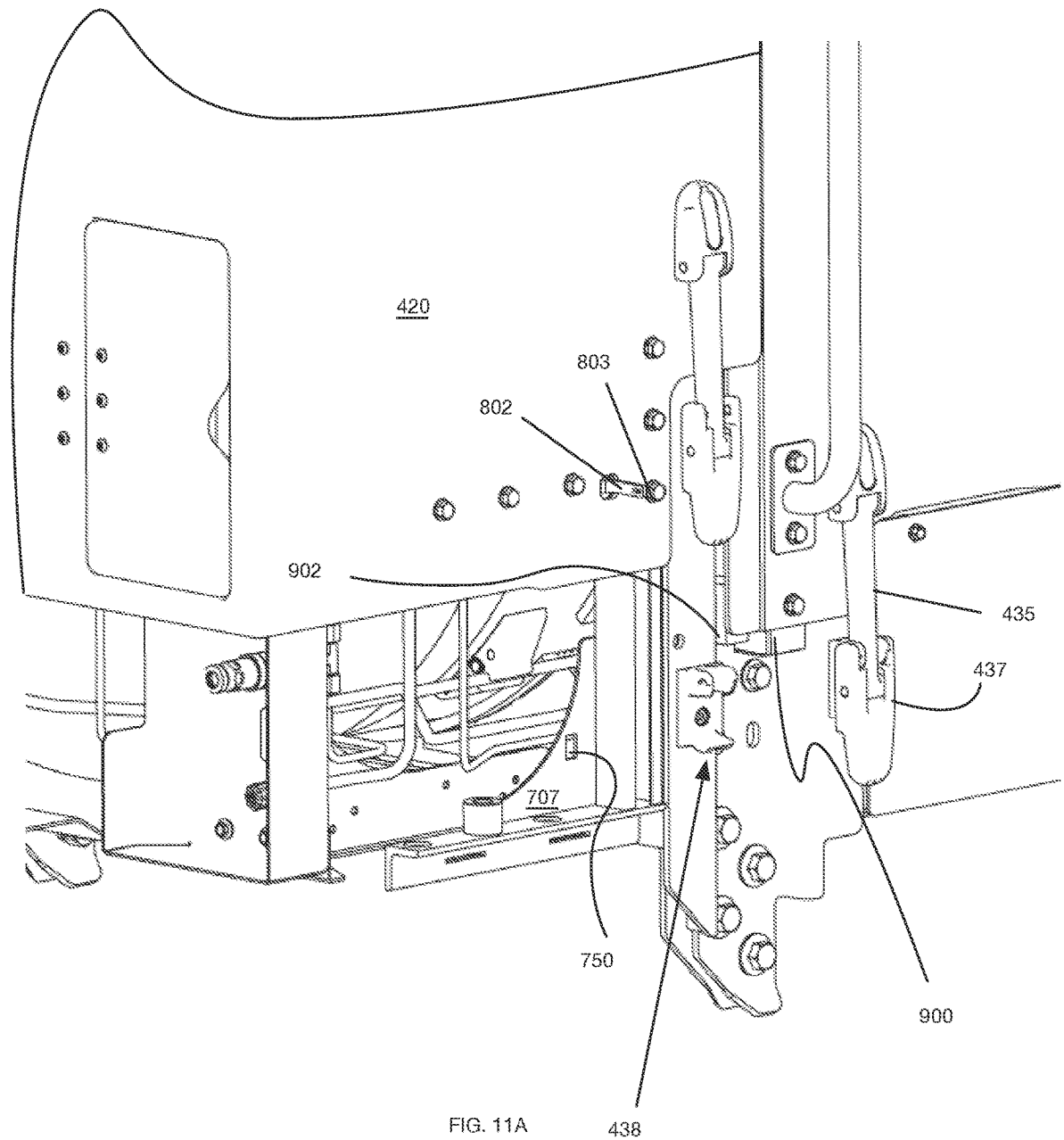
FIGS. 11A and 11B are views of a safety sensor/alarm.
Figure 11B:
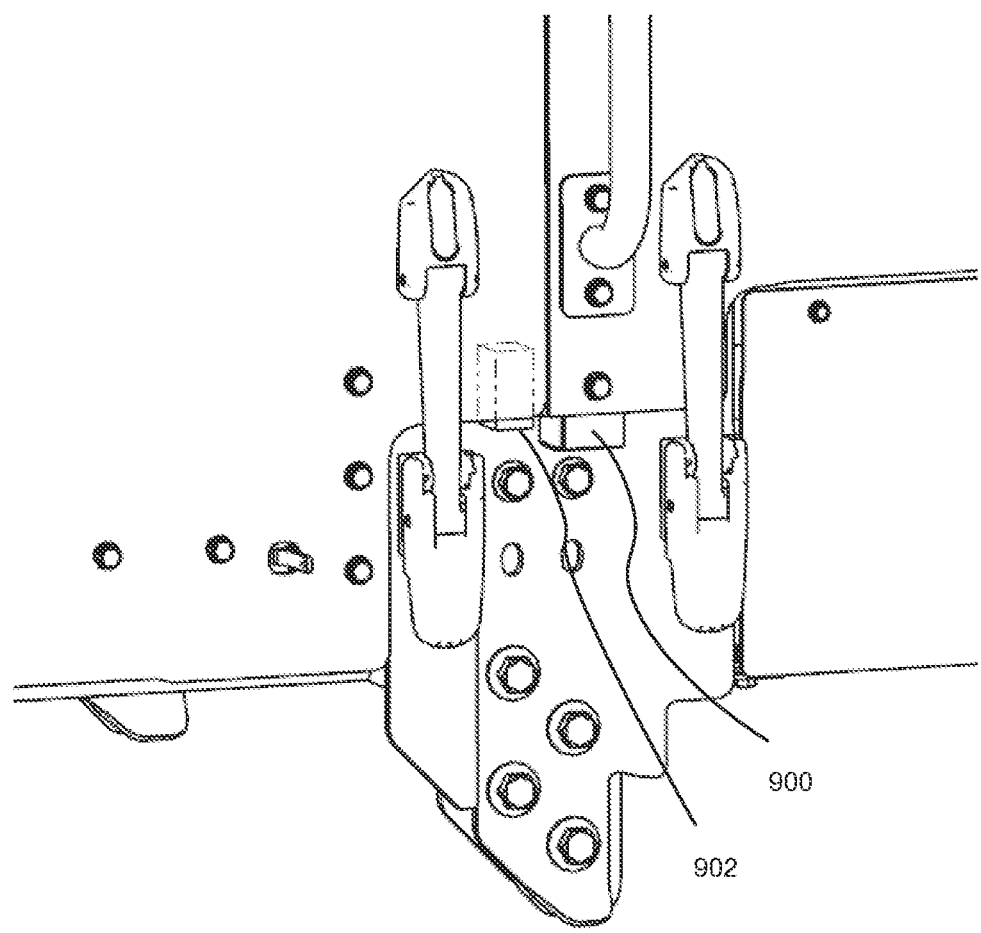

FIGS. 11A and 11B illustrate an alert sensing system configured to engage when the nested shell is constructed. A sensor 900 which may be magnetic, optical or an electrical connection is mounted on the rack and connected to a alert controller (not shown) whereby the controller may set off an alarm inside a vehicle and hard wired to a second controller or ignition system or computing device within the vehicle. Alternatively, or additionally the alert controller or be in signal communications wirelessly to an application remote from the vehicle such as a computer, tablet or smart phone to alert the operator or other interested party of a loose enclosure. Attached to one or more nested shell components is an activator 902 which completes the or closes the circuit between the sensor and activator. When the circuit is broken the alert or alarm is sent. The alarm may include disabling the ignition system of a vehicle until the loose part is corrected. If the sensor circuit is broken or completed the controller determines if an alert, alarm or other responsive action is required. The failure of the sensor activator to align sufficiently with the sensor will cause the control to recognize an alert or alarm condition which can be logged in a database and/or reported as appropriate or used to disable operation.

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. An enclosure to protect fuel tanks behind a cab of a vehicle comprising:
   a fuel system (5) comprising;
   a rack (100);
   a plurality of catch bracket assemblies (700) attached to the rack;
   fuel tanks affixed to the rack;
   a multipart enclosure formed of a plurality of shells configured to nest onto one another and fit over said fuel system;
   a plurality of housing latch assemblies (600) formed on the interior wall surfaces (IWS) of the shells and configured to mate with a corresponding catch bracket assembly on the rack; and,
   each of the housing latch assemblies further comprising at least a bracket attached to the interior wall surface, at least one latching pin (456) affixed to the bracket and a movable coil spring (454) surrounds the latching pin;
   said nested shells are configured with a first end (405A), a second end (405B), a first side (410), and a second side (420);
   wherein leading edges and ledges are formed around at least a portion of a perimeter (P) of each shell;
   wherein the latch and catch assemblies releasably affix the enclosure to the rack and together without the use of threaded fasteners;
   wherein the leading edges and ledges are configured to cooperate to disperse force along the perimeter edges when the enclosure is affixed to the rack; and,
   wherein the nested shells evenly disperse force along the perimeter edges where the shells overlap.

2. The enclosure of claim 1 wherein the nested shells form a top surface (TS).

3. The enclosure of claim 1 further comprising: each catch bracket assembly (700) comprises a catch member (702) attached to the rack having a pin guide (505) corresponding to and configured to receive a corresponding latching pin;
   an elastomeric stop (508); and,
   wherein the elastomeric stop prevents downward movement of the bracket and latching pins beyond a preset threshold.

4. The enclosure of claim 3 further comprising: at least one movable strap fixture (435) affixed to the exterior of one or more ends and sides of the shells;
   an anchor (436) having a latching end (437) affixed to the rack and configured to receive the latching end; and,
   wherein the latch and catch assemblies compress the coil springs when a shell end or side is moved vertically in the "z" axis relative to the rack thereby moving the latching end in a position to mount it with the anchor and affix the shells to the rack.

5. The enclosure of claim 4 further comprising one or more positional sensors (900) attached to the rack configured to report if the nested shell sides and ends fail to be attached to the rack in a predetermined position.

6. The enclosure of claim 5 further comprising an activator (902) affixed to the one or more ends or sides of the shells configured to be adjacent to each positional sensors when the one or more ends and sides of the shells are attached via the one or more movable strap to the rack.

7. The enclosure of claim 5 or 6 wherein the one or more positional sensors are in signal communication with an alert controller to determine if the one or more positional sensors are in a position that requires reporting or an alert.

8. The enclosure of claim 7 wherein the alert controller is configured to at least one of disable the operation of a vehicle, set off an alarm inside a vehicle and communicate wirelessly to an application on a computing device remote from the vehicle to alert the vehicle operator or other interested party.

9. The enclosure of claim 7 further comprising: a locking means (800) comprising;
    a lock interface (750) affixed to the rack;
    an opening (775) in the lock interface configured to accept insertion of a locking plunger;
    a linearly movable spring actuate plunger (802) within plunger guide (804) affixed to the interior wall surface of a shell configured to mate with the opening; and,
    wherein the plunger slides into the opening of the lock interface when the strap fixture attaches the shell to the rack.

10. The enclosure of claim 4 further comprising: a locking means (800) comprising;
    a lock interface (750) affixed to the rack;
    an opening (775) in the lock interface configured to accept insertion of a locking plunger;
    a linearly movable spring actuate plunger (802) within plunger guide (804) affixed to the interior wall surface of a shell configured to mate with the opening; and,
    wherein the plunger slides into the open of the lock interface when the strap fixture attaches the shell to the rack.

11. The enclosure of claim 3 further comprising: at least one slider (550) attached to an interior wall surface of one or more ends and sides of the shells;
    a slider guide (703) attached to the rack configured to receive the at least one slider; and,
    wherein a tapered head of the at least one slider (570) is configured to mate with the slider guide and align the latching pin of the housing latch assembly with a corresponding pin guides thereby of the catch bracket assembly.

12. The enclosure of claim 11 wherein at least one of the at least one sliders or the slider guide is elastomeric.

13. A method of mounting an enclosure to a structure, the method comprising:
    affixing a three dimensional structure or rack behind the cab of a tractor trailer;
    forming a releasable enclosure around the structure by attaching a plurality of nested shells to the structure via housing latch assemblies (600) formed on the interior wall surface of the shells to catch bracket assemblies (700) attached to the structure;
    evenly dispersing force "F" along perimeter edges of the shells when the enclosure is affixed to the structure; and
    placing housing latch assemblies having at least one latching pin affixed to a bracket and configured with a movable coil spring surrounding the latching pin to the interior wall surface of the plurality of shells;
    wherein the latch and catch assemblies releasably affix the shells to the structure or rack and together without the use of threaded fasteners; and,
    wherein the nested shells further comprise a first end (405A), a second end (405B), a first side (410), and a second side (420);
    wherein leading edges and ledges are formed on at least a portion of the perimeter are configured to cooperate to disperse force along the perimeter edges; and,
    wherein the shells evenly disperse force along the perimeter edges where the shells overlap.

14. The method of claim 13 the method further comprising: attaching at least one movable strap fixture affixed to the exterior of one or more shells to the structure; and,
    wherein the latch and catch assemblies compress the coil springs when the shells are moved in the "z" axis relative to the rack thereby moving the latching end of the movable strap fixture in a position to mount it with an anchor to the structure.

15. The method of claim 14, the method further comprising one or more positional sensors attached to the structure configured to report if the releasable enclosure attached to the structure fails to be attached in a predetermined position.

16. The method of claim 15 the method further comprising an activator affixed to the enclosure configured to be adjacent to each positional sensors when the enclosure is attached via the one or more movable strap to the structure.

17. The method of claim 16 wherein the sensor is in signal communication with an alert controller to determines if the positional sensor is in a position that requires reporting or an alert.

18. The method of claim 17 wherein the alert controller is configured to at least one of disable the operation of a vehicle, set off an alarm inside a vehicle and communicate wirelessly to an application on a computing device remote from the vehicle to alert the vehicle operator or other interested party.

19. The method of claim 14 further comprising: affixing elastomeric sliders on interior wall surfaces of at least one of the nested shells; of affixing at least one slider guide to the structure positioned to receive a tapered head of one of the sliders and wherein the slider's tapered head is configured to mate with the at least one slider guide and align the latching pin of the housing latch assembly with a corresponding pin guides thereby of the catch bracket assembly.

* * * * *